(12) United States Patent
Lee et al.

(10) Patent No.: US 8,558,417 B2
(45) Date of Patent: Oct. 15, 2013

(54) COOLING UNIT FOR NUCLEAR REACTOR CONTROL ROD DRIVING APPARATUS

(75) Inventors: Myoung Goo Lee, Daejeon (KR); Hyun Min Kim, Daejeon (KR); Jin Seok Park, Daejeon (KR); In Yong Kim, Daejeon (KR)

(73) Assignee: KEPCO Engineering & Construction Company, Gyeonggi-Do (KR)

( * ) Notice: Subject to any disclaimer, the term of this patent is extended or adjusted under 35 U.S.C. 154(b) by 393 days.

(21) Appl. No.: 13/001,881

(22) PCT Filed: Oct. 29, 2010

(86) PCT No.: PCT/KR2010/007562
§ 371 (c)(1),
(2), (4) Date: Dec. 29, 2010

(87) PCT Pub. No.: WO2011/093578
PCT Pub. Date: Aug. 4, 2011

(65) Prior Publication Data
US 2011/0298307 A1 Dec. 8, 2011

(30) Foreign Application Priority Data
Feb. 1, 2010 (KR) .................. 10-2010-0009156

(51) Int. Cl.
*G21C 7/14* (2006.01)
*H02K 41/02* (2006.01)

(52) U.S. Cl.
USPC ........ 310/12.04; 376/174; 376/243; 376/361; 376/373

(58) Field of Classification Search
USPC ............. 310/12.29; 376/174, 177, 179, 243, 376/228, 232, 361, 366, 373, 374, 375, 377, 376/395, 396, 397, 399
See application file for complete search history.

(56) References Cited

U.S. PATENT DOCUMENTS

| | | | |
|---|---|---|---|
| 4,423,002 A | 12/1983 | Wiart et al. | |
| 4,696,783 A | 9/1987 | Lesauliner et al. | |
| 6,554,586 B1 * | 4/2003 | Lustwerk | ...................... 417/366 |

FOREIGN PATENT DOCUMENTS

| | | |
|---|---|---|
| JP | 02-108998 A | 4/1990 |
| JP | 2009-198400 A | 9/2009 |
| KR | 1019940002702 B1 | 3/1994 |

OTHER PUBLICATIONS

International Search Report: mailed Jun. 27, 2011; PCT/KR2010/007562.

* cited by examiner

*Primary Examiner* — Tran Nguyen
*Assistant Examiner* — Leda Pham
(74) *Attorney, Agent, or Firm* — Ladas & Parry LLP

(57) ABSTRACT

A cooling unit cooling a coil assembly that generates electromagnetic force for driving a nuclear reactor control rod, and including a coil surrounding a driving shaft of the nuclear reactor control rod so as to generate the electromagnetic force; a coil housing surrounding the coil so as to enclose the coil; a cooling shroud-shell forming a cooling flow path between the cooling shroud-shell and the coil housing, whereby a cooling fluid for cooling heat that is generated in the coil passes through the cooling flow path; and a plurality of cooling fins disposed on the cooling flow path in a radial direction so as to allow heat to be effectively exchanged between the coil and the cooling fluid that flows through the cooling flow path.

4 Claims, 4 Drawing Sheets

COOLING UNIT FOR NUCLEAR REACTOR CONTROL ROD DRIVING APPARATUS

TECHNICAL FIELD

The present invention relates to a cooling unit for a nuclear reactor control rod driving apparatus, and more particularly, to a cooling unit for a nuclear reactor control rod driving apparatus which can increase the cooling efficiency, has simplified structure for a cooling operation and is easy to manufacture.

BACKGROUND ART

FIG. 1 is a cross-sectional view of a cooling unit for a nuclear reactor control rod driving apparatus according to the related art. FIG. 2 is a cross-sectional view of the cooling unit of FIG. 1, taken along the line II-II.

As illustrated in FIGS. 1 and 2, the cooling unit according to the related art is arranged to cool the nuclear reactor control rod driving apparatus. Here, the nuclear reactor control rod driving apparatus includes a coil assembly 100 for generating the electromagnetic force for driving a control rod, and the coil assembly 100 includes coils 101 and housings 102 for enclosing the coils 101.

The coil 101 configured in the nuclear reactor control rod driving apparatus may thermally deteriorate by the electrical resistance heat due to the operating current, and thus it is necessary to reduce the possibility of thermal aging to increase the lifetime of the coil 101 by removing the heat.

In order to drive the control rod based on necessity, it is essential to include a cooling unit. However, a cooling unit for the nuclear reactor control rod driving apparatus according to the related art is designed in such a manner that heat generated in the coil 101 is simply cooled by the cooling air flow, whose path 130 is formed between the housing 102 and a cooling shroud-shell 120. For example, in case of an air cooling process, the external air removes the heat of the coil 101 by passing the cooling air flow path 130, but the cooling efficiency is significantly low.

DISCLOSURE OF INVENTION

Solution to Problem

The present invention provides a cooling unit for a nuclear reactor control rod driving apparatus.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

Figure 1:
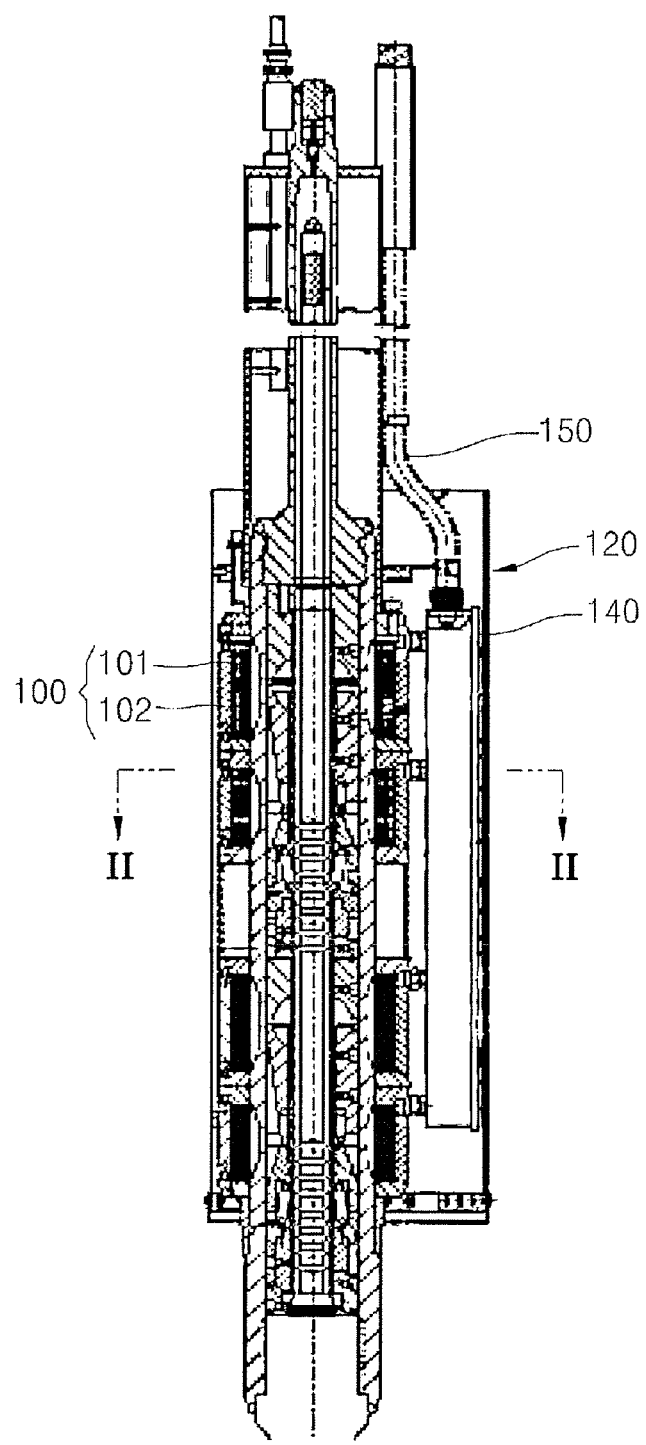
FIG. 1 is a cross-sectional view of a cooling unit for a nuclear reactor control rod driving apparatus according to the related art.
Figure 2:
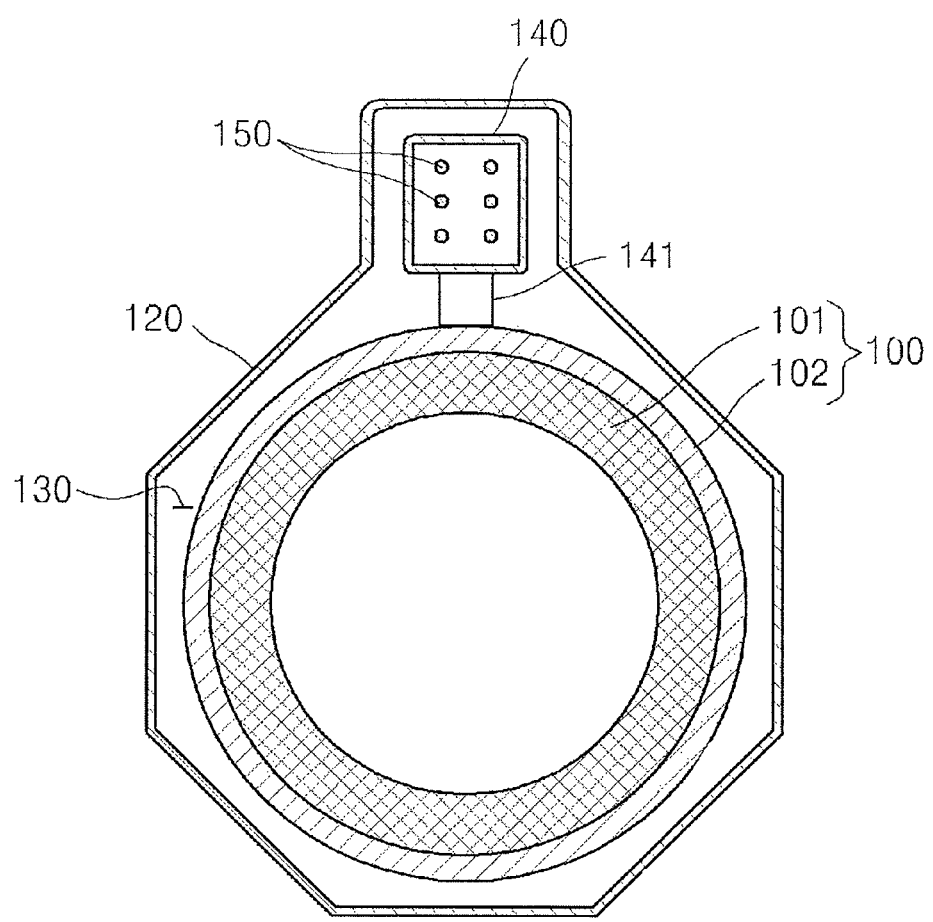
FIG. 2 is a cross-sectional view of the cooling unit of FIG. 1, taken along the line II-II.

The present invention provides a cooling unit for a nuclear reactor control rod driving apparatus, whereby the nuclear reactor control rod driving apparatus can be efficiently cooled by using the cooling unit of a simple structure.

The present invention also provides a simple cooling unit for a nuclear reactor control rod driving apparatus being easy to be manufactured.

According to an aspect of the present invention, there is provided a cooling unit cooling a coil assembly that generates electromagnetic force for driving a nuclear reactor control rod, and including a coil surrounding a driving shaft of the nuclear reactor control rod so as to generate the electromagnetic force; a coil housing surrounding the coil so as to enclose the coil; a cooling shroud-shell forming a cooling flow path between the cooling shroud-shell and the coil housing, whereby a cooling fluid for cooling heat that is generated in the coil passes through the cooling flow path; and a plurality of cooling fins disposed on the cooling flow path in a radial direction so as to allow heat to be effectively exchanged between the coil and the cooling fluid that flows through the cooling flow path.

The plurality of cooling fins may be integrally formed with the coil housing in such a manner that the plurality of cooling fins extend from an outer surface of the coil housing, and the plurality of cooling fins are disposed in such a manner that the tips of the cooling fins contact an inner surface of the cooling shroud-shell.

The coil housing may be a hollow tube having an inner surface and an outer surface, wherein a wiring passage is formed between the inner surface and the outer surface of the coil housing, and wherein the wiring passage extends along a central axis of the coil housing and is a part through which lead wires for supplying electric power to the coil passes.

The cooling shroud-shell may be separate from the coil housing by a predetermined distance, and has a polygonal hollow tube shape.

According to another aspect of the present invention, there is provided a cooling unit for the coil assembly of a nuclear reactor control rod driving apparatus, that generates electromagnetic force for driving the nuclear reactor control rods, and including a plurality of coil housings surrounding the plurality of coils so as to enclose the plurality of coils, respectively, and disposed in such a manner that outer surfaces of the plurality of coil housings are separate from each other; a cooling shroud-shell having a space for containing the plurality of coil housings, and forming a cooling flow path in the space between an inner surface of the cooling shroud-shell, the outer surfaces of the plurality of coil housings, and the adjacent coil housings, wherein the cooling flow path is for a heat exchange between a cooling fluid and the plurality of coil housings; and a plurality of cooling fins respectively projected from outer surfaces of the plurality of coil housings toward the cooling flow path so as to enlarge an area of the heat exchange between the cooling fluid and the plurality of coil housings.

Mode for the Invention

Hereinafter, a cooling unit for a nuclear reactor control rod driving apparatus, according to one or more embodiments of the present invention, will be described in detail by explaining exemplary embodiments of the invention with reference to the attached drawings.

Figure 3:
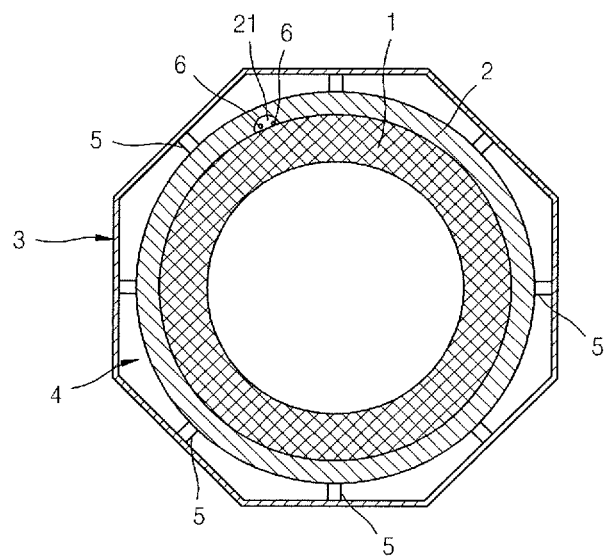
FIG. 3 is a cross-sectional view of a cooling unit for a nuclear reactor control rod driving apparatus, according to an embodiment of the present invention.
Figure 4:
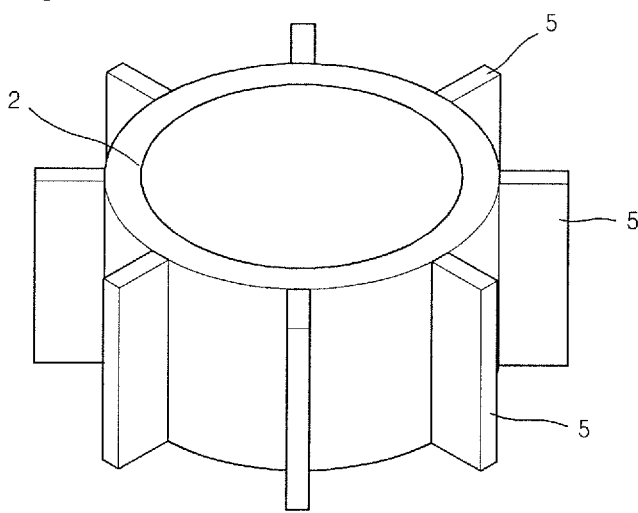
FIG. 4 is a perspective view of a coil housing in the cooling unit of FIG. 3.

FIG. 3 is a cross-sectional view of a cooling unit for a nuclear reactor control rod driving apparatus, according to an embodiment of the present invention. FIG. 4 is a perspective view of a coil housing 2 in the cooling unit of FIG. 3.

As illustrated in FIGS. 3 and 4, the cooling unit for the nuclear reactor control rod driving apparatus is arranged to cool a coil assembly for generating electromagnetic force for driving a nuclear reactor control rod (not shown), and includes a coil 1, a coil housing 2, a cooling shroud-shell 3, and a plurality of cooling fins 5.

The coil 1 surrounds a driving shaft (not shown) of the nuclear reactor control rod so as to generate the electromagnetic force, and the coil housing 2 surrounds the coil 1 so as to enclose the coil 1.

The cooling shroud-shell 3 is encircled around the coil housing 2 so as to allow a cooling flow path 4 to be formed between the coil housing 2 and the cooling shroud-shell 3. The cooling shroud-shell 3 forms the cooling flow path 4 through which a cooling fluid flows, and thus functions to remove the heat generated from the coil 1.

The cooling fins 5 are disposed in the cooling flow path 4 in a radial direction. The cooling fins 5 enlarge a heat exchange area between the coil 1 and the cooling fluid that flows into the cooling flow path 4, and thus functions to effectively remove the heat generated from the coil 1.

The cooling unit according to the present embodiment enlarges a heat-transfer area by disposing the cooling fins 5 in the cooling flow path 4 in a radial direction, and thus may increase the cooling efficiency.

In particular, according to the present embodiment, as illustrated in FIG. 4, since the cooling fins 5 are integrally formed with the coil housing 2, the conventional coil housing 2 may be shaped without considerable modification in its structure so that it is advantageous in that a cooling efficiency may be improved without a large increase of manufacturing costs due to structure modification.

That is, the cooling fins 5 are integrally formed with the coil housing 2 in such a manner that the cooling fins 5 extend from an outer surface of the coil housing 2. The cooling fins 5 are disposed in such a manner that the tips of the cooling fins 5 contact an inner surface of the cooling shroud-shell 3. By doing so, the cooling fins 5 according to the present embodiment function to not only increase the cooling efficiency by increasing the heat-transfer area between the coil housing 2 and the cooling fluid flowing through the cooling flow path 4 but also function to further increase the cooling efficiency by allowing the heat to be radiated via the cooling shroud-shell 3 due to contact between the cooling fins 5 and the cooling shroud-shell 3.

Meanwhile, the coil housing 2 is a hollow tube having an inner surface and the outer surface, and a wiring passage 21 is formed between the inner surface and the outer surface, extending along a central axis line of the coil housing 2. Here, the wiring passage 21 is a part through which the lead wires 6 for supplying electric power to the coil 1 passes.

In this manner, according to the present embodiment, it is not necessary to separately arrange a terminal box inside the cooling shroud-shell 3 so as to form the wiring passage 21, as arranged in the related art. Thus, a structure of the cooling shroud-shell 3 may be simplified, and it may be easy to form the cooling shroud-shell 3.

That is, as illustrated in FIG. 3, it is not necessary for the cooling shroud-shell 3 to have a projected shape as required in the related art for arrangement of the terminal box, and it is possible to form the cooling shroud-shell 3 to have a polygonal tube shape. By doing so, it is possible to easily form the cooling shroud-shell 3 so that a mass-production efficiency of the present embodiment may be increased.

Figure 5:
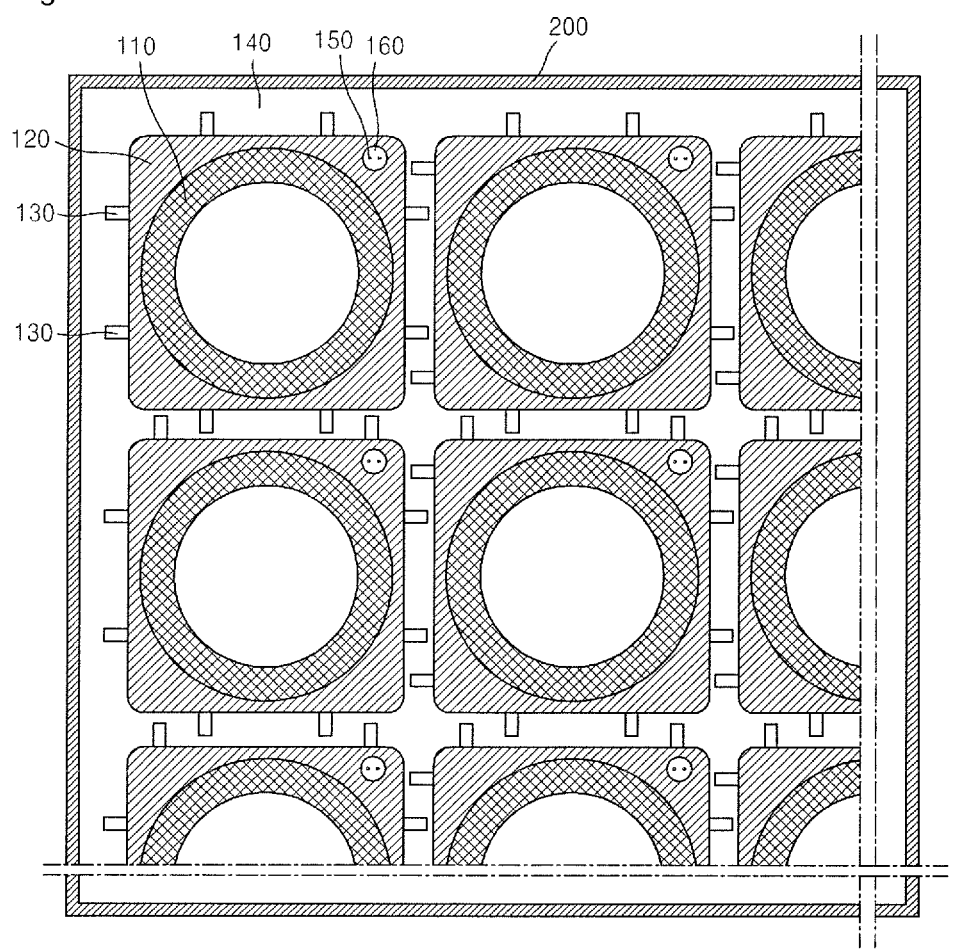
FIG. 5 is a cross-sectional view of a cooling unit for a nuclear reactor control rod driving apparatus according to another embodiment of the present invention corresponding to the embodiment of FIG. 3.

FIG. 5 is a cross-sectional view of a cooling unit for a nuclear reactor control rod driving apparatus according to another embodiment of the present invention corresponding to the previous embodiment of FIG. 3.

In the present embodiment illustrated in FIG. 5, a plurality of nuclear reactor control rod driving apparatuses are disposed at regular intervals.

A plurality of coil housings 120 for enclosing the coils 110 are disposed at regular intervals in such a manner that an inner surface of each coil housing 120 surrounds the respective coil 110.

The present embodiment includes a cooling shroud-shell 200 for surrounding the coil housings 120 by one unit, and for forming a cooling flow path 140 in a space between the cooling shroud-shell 200 and the coil housings 120.

The cooling shroud-shell 200 simultaneously functions to form the cooling flow path 140 for heat exchange between the coil housings 120 and a cooling fluid, and to surround the coil housings 120.

In the present embodiment, in order to enlarge a heat exchange area between the coil housings 120 and the cooling fluid, a plurality of cooling fins 130 are respectively projected from outer surfaces of the coil housings 120 toward the cooling flow path 140, and a wiring passage 160 is formed in each of the coil housings 120, wherein the wiring passage 160 is a part through which the lead wires 150 for supplying electric power to a respective coil 110 passes.

According to the present embodiment, although the coils 110 and the coil housings 120 are cooled by the single cooling shroud-shell 200, a cooling efficiency of the nuclear reactor control rod driving apparatus may be further increased by the cooling fins 130 that are formed in the cooling flow path 140.

According to the one or more embodiments of the present invention, the cooling unit for the nuclear reactor control rod driving apparatus has a simple structure by which the cooling efficiency of the nuclear reactor control rod driving apparatus may be increased, and is easy to be manufactured, whereby mass-production efficiency may be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A cooling unit cooling a coil assembly that generates electromagnetic force for driving a nuclear reactor control rod comprising:
   a coil surrounding a driving shaft of the nuclear reactor control rod so as to generate the electromagnetic force;
   a coil housing surrounding the coil so as to enclose the coil;
   a cooling shroud-shell forming a cooling flow path between the cooling shroud-shell and the coil housing, whereby a cooling fluid for cooling heat that is generated in the coil passes through the cooling flow path; and
   a plurality of cooling fins disposed on the cooling flow path in a radial direction so as to allow heat to be effectively exchanged between the coil and the cooling fluid that flows through the cooling flow path,
   wherein the coil housing is a hollow tube having an inner surface and an outer surface, wherein a wiring passage is formed between the inner surface and the outer surface of the coil housing, and wherein the wiring passage extends along a central axis of the coil housing and is a part through which lead wires for supplying electric power to the coil passes.

2. The cooling unit of claim 1, wherein the plurality of cooling fins are integrally formed with the coil housing in such a manner that the plurality of cooling fins extend from an outer surface of the coil housing, and the plurality of cooling fins are disposed in such a manner that the tips of the cooling fins contact an inner surface of the cooling shroud-shell.

3. The cooling unit of claim 1, wherein the cooling shroud-shell is separate from the coil housing by a predetermined distance, and has a polygonal hollow tube shape.

4. A cooling unit for the coil assembly of a nuclear reactor control rod driving apparatus, that generates electromagnetic force for driving the nuclear reactor control rods comprising:
   a plurality of coil housings surrounding the plurality of coils so as to enclose the plurality of coils, respectively, and disposed in such a manner that outer surfaces of the plurality of coil housings are separate from each other;
   a cooling shroud-shell having a space for containing the plurality of coil housings, and forming a cooling flow path in the space between an inner surface of the cooling shroud-shell, the outer surfaces of the plurality of coil housings, and the adjacent coil housings, wherein the cooling flow path is for a heat exchange between a cooling fluid and the plurality of coil housings; and
   a plurality of cooling fins respectively projected from outer surfaces of the plurality of coil housings toward the cooling flow path so as to enlarge an area of the heat exchange between the cooling fluid and the plurality of coil housings.

* * * * *